(12) United States Patent
Quitmann et al.

(10) Patent No.: US 8,236,274 B2
(45) Date of Patent: Aug. 7, 2012

(54) CARBON BLACK, METHOD OF PRODUCING CARBON BLACK, AND DEVICE FOR IMPLEMENTING THE METHOD

(75) Inventors: Catharina Quitmann, Köln (DE); Alfons Karl, Gründau (DE); Matthias Katzer, Schlüchtern (DE); Kai Krauss, Grosskrotzenburg (DE); Michael Stanyschöfsky, Hürth (DE)

(73) Assignee: Evonik Carbon Black GmbH, Hanau (DE)

( * ) Notice: Subject to any disclaimer, the term of this patent is extended or adjusted under 35 U.S.C. 154(b) by 394 days.

(21) Appl. No.: 11/882,702

(22) Filed: Aug. 3, 2007

(65) Prior Publication Data

US 2008/0219915 A1      Sep. 11, 2008

(30) Foreign Application Priority Data

Aug. 7, 2006   (DE) .......................... 10 2006 037 079

(51) Int. Cl.
*C01D 3/00* (2006.01)
*C09C 1/44* (2006.01)

(52) U.S. Cl. ............... 423/449.1; 423/449.2; 106/38.28; 106/472; 106/478

(58) Field of Classification Search ............... 423/449.1, 423/449.2, 449.3, 450, 449.9; 106/38.28, 106/472, 478; 422/150; *C01D 3/00*
See application file for complete search history.

(56) References Cited

U.S. PATENT DOCUMENTS

| | | |
|---|---|---|
| 3,133,893 A | 5/1964 | Newmann |
| 3,314,814 A | 4/1967 | Newman |
| 3,519,452 A | 7/1970 | Rivin |
| 3,660,133 A | 5/1972 | Van Der Schuyt et al. |
| 3,705,043 A | 12/1972 | Zabiak |
| 3,749,670 A | 7/1973 | Ormsbee |
| 3,841,888 A | 10/1974 | Belde |
| 3,903,034 A | 9/1975 | Zabiak et al. |

(Continued)

FOREIGN PATENT DOCUMENTS

| | | |
|---|---|---|
| CA | 2 740 672 A1 | 4/2010 |
| CN | 1858531 A | 11/2006 |
| DE | 203 711 C | 10/1908 |
| DE | 25 40 355 | 3/1976 |
| DE | 30 41 188 A1 | 6/1982 |

(Continued)

OTHER PUBLICATIONS

European Search for for EP 07 11 2149.
Gerhartz, et al., "Gas Black and Channel Black," *Ullmann's Encyclopedia of Industrial Chemistry* A5:148-150; XP-002465931.
Gerspacher, M., "Dynamic Viscoelastic Properties of Loaded Elastomers," Chapter 11 Carbon Black, Donnet, et al. eds., Marcel Dekker Inc., New York, ed. 2 (1993) pp. 377-387.
Funt, et al., "Carbon Black in Plastics," Chapter 12 Carbon Black, Donnet, et al. eds., Marcel Dekker Inc., New York, ed. 2 (1993) p. 389-408.

(Continued)

*Primary Examiner* — Jerry Lorengo
*Assistant Examiner* — Carlos Barcena
(74) *Attorney, Agent, or Firm* — Law Office of Michael A. Sanzo, LLC

(57) ABSTRACT

The invention relates to a carbon black having an aggregate size distribution which has a $(d_{90}-d_{10})/d_{50}$ ratio of less than or equal to 1.1. The carbon blacks are produced by admixing hot air if desired to a gas mixture comprising a carrier gas and a carbon black feedstock, passing the gas mixture into a burner pipe, burning the gas mixture at the burner pipe openings, and drawing the flames under suction, together with the ambient air drawn in freely under suction from the outside, through a cooled, narrowing gap, and carrying out cooling, the cooled, narrowing gap having a height (h) to width (b) ratio of 1-100, the width (b) being 0.5 to 10 mm, and the flow rate at the narrowest point of the gap being 10-200 m/s. The carbon blacks of the invention can be used as non-reinforcing filler, reinforcing filler, UV stabilizer, conductive black, pigment or reducing agent.

20 Claims, 1 Drawing Sheet

U.S. PATENT DOCUMENTS

| | | | |
|---|---|---|---|
| 3,946,138 A | 3/1976 | Jones | |
| 3,978,019 A | 8/1976 | Oelmann | |
| 3,998,652 A | 12/1976 | Aigu | |
| 4,055,439 A | 10/1977 | Babler | |
| 4,075,160 A | 2/1978 | Mills | |
| 4,076,527 A | 2/1978 | Nealy | |
| 4,366,139 A | 12/1982 | Kuhner | |
| 4,368,582 A | 1/1983 | Graser | |
| 4,435,377 A | 3/1984 | Rothbuhr | |
| 4,435,378 A | 3/1984 | Reck | |
| 4,486,033 A | 12/1984 | Parrotta | |
| 4,536,776 A | 8/1985 | Knirsch | |
| 4,698,913 A | 10/1987 | Voll | |
| 4,836,852 A | 6/1989 | Knirsch | |
| 4,879,335 A | 11/1989 | Hirota | |
| 4,909,853 A | 3/1990 | Wienkenhover | |
| 4,963,616 A | 10/1990 | Jenekhe | |
| 5,021,291 A | 6/1991 | Kobayashi | |
| 5,085,698 A | 2/1992 | Ma | |
| 5,164,232 A | 11/1992 | Henseleit | |
| 5,236,992 A | 8/1993 | Bush | |
| 5,320,668 A | 6/1994 | Shields | |
| 5,531,818 A | 7/1996 | Lin | |
| 5,554,739 A | 9/1996 | Belmont | |
| 5,609,671 A | 3/1997 | Nagasawa | |
| 5,620,743 A | 4/1997 | Harth | |
| 5,639,817 A | 6/1997 | Probst | |
| 5,713,988 A | 2/1998 | Belmont et al. | |
| 5,760,112 A | 6/1998 | Hirota | |
| 5,837,044 A | 11/1998 | Santilli | |
| 5,851,280 A | 12/1998 | Belmont | |
| 5,859,120 A | 1/1999 | Karl | |
| 5,922,118 A | 7/1999 | Johnson | |
| 5,929,134 A | 7/1999 | Lent | |
| 5,977,209 A | 11/1999 | Breton | |
| 6,056,933 A | 5/2000 | Vogler et al. | |
| 6,063,182 A | 5/2000 | Babler | |
| 6,099,818 A | 8/2000 | Freund | |
| 6,132,505 A | 10/2000 | Linde | |
| 6,136,286 A | 10/2000 | Okuyama | |
| 6,171,382 B1 | 1/2001 | Stubbe | |
| 6,212,794 B1 | 4/2001 | Zhu | |
| 6,221,142 B1 | 4/2001 | Wang | |
| 6,224,735 B1 | 5/2001 | Akutsu | |
| 6,228,928 B1 | 5/2001 | Soeda et al. | |
| 6,242,382 B1 | 6/2001 | Bratz | |
| 6,251,983 B1 | 6/2001 | Vogler et al. | |
| 6,290,767 B1 | 9/2001 | Bergemann et al. | |
| 6,312,513 B1 | 11/2001 | Hoefer | |
| 6,337,302 B1 | 1/2002 | Teng | |
| 6,358,487 B1 | 3/2002 | Omae et al. | |
| 6,387,168 B1 | 5/2002 | Koitabashi | |
| 6,451,100 B1 | 9/2002 | Karl | |
| 6,471,763 B1 | 10/2002 | Karl | |
| 6,491,976 B2 | 12/2002 | Horiuchi | |
| 6,503,311 B1 | 1/2003 | Karl | |
| 6,569,231 B1 | 5/2003 | Mathias | |
| 6,582,505 B1 | 6/2003 | Bouvy | |
| 6,646,023 B1 | 11/2003 | Nyssen | |
| 6,660,075 B2 | 12/2003 | Bergemann et al. | |
| 6,685,769 B1 | 2/2004 | Karl | |
| 6,715,420 B2 | 4/2004 | Blake | |
| 6,758,891 B2 | 7/2004 | Bergemann et al. | |
| 6,780,389 B2 | 8/2004 | Karl | |
| 6,783,836 B2 | 8/2004 | Bennett | |
| 6,821,334 B2 | 11/2004 | Nakamura | |
| 6,956,006 B1 | 10/2005 | Mirsky | |
| 6,960,250 B2 | 11/2005 | Luethge et al. | |
| 7,005,004 B2 | 2/2006 | Kalbitz | |
| 7,160,377 B2 | 1/2007 | Zoch | |
| 7,172,652 B2 | 2/2007 | Zoch et al. | |
| 7,217,405 B2 | 5/2007 | Karl | |
| 7,300,964 B2 | 11/2007 | Niedermeier et al. | |
| 7,435,857 B2 | 10/2008 | Poellmann | |
| 2001/0036994 A1 | 11/2001 | Bergemann | |
| 2002/0041317 A1 | 4/2002 | Kashiwazaki | |
| 2003/0000409 A1 | 1/2003 | Blake | |
| 2003/0013797 A1 | 1/2003 | Thielen et al. | |
| 2003/0114350 A1* | 6/2003 | Schmitt et al. | 510/466 |
| 2003/0134938 A1 | 7/2003 | Nakamura | |
| 2003/0180210 A1 | 9/2003 | Karl | |
| 2004/0087707 A1 | 5/2004 | Zoch | |
| 2004/0123773 A1 | 7/2004 | Butler | |
| 2004/0248731 A1 | 12/2004 | Vogel et al. | |
| 2005/0014864 A1 | 1/2005 | Akers | |
| 2005/0062205 A1 | 3/2005 | Zak | |
| 2005/0090609 A1 | 4/2005 | Reisacher | |
| 2006/0086834 A1 | 4/2006 | Pfeffer | |
| 2006/0230550 A1 | 10/2006 | Hees | |
| 2006/0243165 A1 | 11/2006 | Lüthge | |
| 2007/0031319 A1 | 2/2007 | Lüthge | |
| 2007/0043157 A1 | 2/2007 | Riebel | |
| 2007/0044682 A1 | 3/2007 | Nick | |
| 2007/0076068 A1 | 4/2007 | Guo | |
| 2007/0076071 A1 | 4/2007 | Iu | |
| 2008/0110552 A1 | 5/2008 | Arnold | |
| 2008/0214730 A1 | 9/2008 | Henry | |
| 2009/0035210 A1 | 2/2009 | Krauss | |
| 2009/0155157 A1 | 6/2009 | Stenger | |
| 2009/0305011 A1 | 12/2009 | McIntosh | |
| 2010/0147187 A1 | 6/2010 | Tauber | |
| 2010/0180794 A1 | 7/2010 | Tauber | |
| 2010/0248120 A1 | 9/2010 | Riebel | |
| 2011/0034611 A1 | 2/2011 | Pelster et al. | |
| 2011/0207872 A1 | 8/2011 | Schinkel | |
| 2011/0232531 A1 | 9/2011 | Götz | |

FOREIGN PATENT DOCUMENTS

| | | |
|---|---|---|
| DE | 36 15 571 A1 | 11/1987 |
| DE | 43 08 488 A1 | 9/1994 |
| DE | 195 21 565 | 1/1997 |
| DE | 196 13 796 | 10/1997 |
| DE | 197 31 572 | 1/1999 |
| DE | 197 48 575 | 5/1999 |
| DE | 198 39 925 A1 | 10/1999 |
| DE | 198 24 947 | 12/1999 |
| DE | 199 34 282 | 1/2001 |
| DE | 102 42 875 A1 | 5/2003 |
| DE | 10 2004 058 271 | 6/2006 |
| DE | 10 2007 026 214 A1 | 12/2008 |
| DE | 10 2007 026 551 | 12/2008 |
| EP | 0 036 520 A2 | 9/1981 |
| EP | 0 176 707 A1 | 4/1986 |
| EP | 0 259 130 A2 | 3/1988 |
| EP | 0 263 412 | 4/1988 |
| EP | 0 282 855 A2 | 9/1988 |
| EP | 0 655 516 A1 | 5/1995 |
| EP | 0 803 780 A1 | 10/1997 |
| EP | 0 857 764 A2 | 8/1998 |
| EP | 0 969 052 A1 | 1/2000 |
| EP | 1 061 106 A1 | 12/2000 |
| EP | 1 061 107 A1 | 12/2000 |
| EP | 1 103 173 A1 | 5/2001 |
| EP | 1 134 261 A2 | 9/2001 |
| EP | 1 167 470 A | 1/2002 |
| EP | 1 347 018 A1 | 9/2003 |
| EP | 1 783 178 | 5/2007 |
| FR | 1 233 251 A | 10/1960 |
| GB | 895990 | 5/1962 |
| JP | 1-272645 | 10/1989 |
| JP | 3-124772 | 5/1991 |
| JP | 4-18438 | 1/1992 |
| JP | 5-78110 | 3/1993 |
| JP | 7-258578 | 10/1995 |
| JP | 7-268148 | 10/1995 |
| JP | 08-015895 | 1/1996 |
| JP | 9-67528 | 3/1997 |
| JP | 9-124312 | 5/1997 |
| JP | 11-158425 | 6/1999 |
| JP | 11-189735 | 7/1999 |
| JP | 11-189736 | 7/1999 |
| JP | 11-302557 | 11/1999 |
| JP | 11-315220 | 11/1999 |
| JP | 2000-212468 | 8/2000 |
| JP | 2000-248118 | 9/2000 |
| JP | 2000-248194 | 9/2000 |
| JP | 2000-248196 | 9/2000 |

| | | |
|---|---|---|
| JP | 2000-248197 | 9/2000 |
| JP | 2000-290529 | 10/2000 |
| JP | 2001-40240 | 2/2001 |
| JP | 2001-254033 | 9/2001 |
| JP | 2001-329205 | 11/2001 |
| JP | 2002-080758 | 3/2002 |
| JP | 2003-049101 | 2/2003 |
| JP | 2004-067903 | 3/2004 |
| JP | 2004-75985 | 3/2004 |
| JP | 2006-008899 | 1/2006 |
| SU | 532612 | 2/1977 |
| SU | 887587 | 12/1981 |
| WO | WO 92/13983 | 8/1992 |
| WO | WO 95/23038 | 8/1995 |
| WO | WO 96/18688 | 6/1996 |
| WO | WO 96/18694 A2 | 6/1996 |
| WO | WO 97/32571 A1 | 9/1997 |
| WO | WO 98/42192 | 10/1998 |
| WO | WO 98/42778 | 10/1998 |
| WO | WO 98/45361 | 10/1998 |
| WO | WO 99/58617 | 11/1999 |
| WO | WO 00/09254 | 2/2000 |
| WO | WO 00/77104 | 12/2000 |
| WO | WO 01/55050 | 8/2001 |
| WO | WO 03/014238 A | 2/2003 |
| WO | WO 03/055959 A1 | 7/2003 |
| WO | WO 03/064540 A1 | 8/2003 |
| WO | WO 2004/046256 A1 | 6/2004 |
| WO | WO 2005/017047 A1 | 2/2005 |
| WO | WO 2005/022667 A2 | 3/2005 |
| WO | WO 2005/028978 A1 | 3/2005 |
| WO | WO 2006/061110 A1 | 6/2006 |
| WO | WO 2006/066132 A2 | 6/2006 |
| WO | WO 2007/027625 A2 | 3/2007 |
| WO | WO 2008/148639 A2 | 12/2008 |
| WO | WO 2010/043562 A1 | 4/2010 |
| WO | WO 2007/039604 A2 | 4/2012 |

OTHER PUBLICATIONS

English language abstract for Japanese patent reference JP 1-272645, listed as document B2 above, Oct. 31, 1989.
English language abstract for Japanese patent reference JP 4-18438, listed as document B3 above, Jan. 22, 1992.
English language abstract for Japanese patent reference JP 7-268148, listed as document B4 above, Oct. 17, 1995.
English language abstract for Japanese patent reference JP 11-302557, listed as document B5 above, Nov. 2, 1999.
English language translation of German patent reference DE 203 711 C cited in an IDS filed Apr. 28, 2008.
English language abstract for WO 2010/043562 A1, listed as document B4 above, 2010.
*Chemielexikon Römpp*; RÖMPP Online-ID=RD-07-00259, Gas Black; http://www.roempp.com/prod/roemp.php, 2011.
"Improved Test for Determination of Carbon Black Structure" presented by Wesley Wampler; Carbon Black World 2004; Nov. 15, 2004; XP002637916.
English language abstract for JP 2002-080758, listed as document B1 above, 2002.
Machine translation of JP 2002-080758, listed as document B1 above, 2002.
English language abstract for JP 2003-049101, listed as document B2 above, 2003.
Machine translation of JP 2003-049101, listed as document B2 above, 2003.
English language abstract for JP 2004-067903, listed as document B3 above, 2004.
Machine translation of JP 2004-067903, listed as document B3 above, 2004.
English language abstract for CN 1858531 A, listed as document B1 above, 2006.
English language abstract for DE 36 15 571, listed as document B4 above, 1987.
English language abstract for DE197 31 572, listed as document B7 above, 1999.
English language abstract for DE 198 24 947, listed as document B9 above, 1999.
English language abstract for DE 10 2004 058 271, listed as document B12 above, 2006.
English language abstract for DE 10 2007 026 214 A1, listed as document B14 above, 2008.
English language translation of summary for FR 1 233 251, listed as document B30 above, 1960.
English language abstract for JP 3-124772, listed as document B32 above, 1991.
English language abstract for JP 5-78110, listed as document B33 above. 1993.
English language abstract for JP 08-015895, listed as document B35 above, 1996.
English language abstract for JP 9-67528, listed as document B36 above, 1997.
English language abstract for JP 9-124312, listed as document B37 above, 1997.
English language abstract for JP 11-158425, listed as document B38 above, 1999.
English language translation for JP 11-189735, listed as document B39 above, 1999.
English language abstract for JP 11-189736, listed as document B40 above, 1999.
English language Abstract for JP 11-315220, listed as document B41 above, 1999.
English language Abstract for JP 11-315220, listed as document B41 above. 1999.
English language abstract for JP 2000-212468, listed as document B42 above, 2000.
English language abstract for JP 2000-248197, listed as document B43 above, 2000.
English language abstract for JP 2000-248194, listed as document B44 above, 2000.
English language abstract for JP 2000-248118, listed as document B45 above, 2000.
English language abstract for JP 2000-248196, listed as document B46 above, 2000.
English language abstract for JP 2000-290529, listed as document B47 above, 2000.
English language abstract for JP 2001-40240, listed as document B48 above, 2001.
English language abstract for JP 2001-254033, listed as document B49 above, 2001.
English language abstract for JP 2001-329205, listed as document B50 above, 2001.
English language abstract for JP 2004-75985, listed as document B51 above, 2004.
English language abstract for JP 2006-008899, listed as document B52 above, 2006.
English language abstract for SU 532612, listed as document B53 above, 1977.
English language abstract for SU 887587, listed as document B54 above, 1981.
English language abstract for WO 92/13983, listed as document B55 above, 1992.
English language abstract for WO 01/55050, listed as document B64 above, 2001.
English language abstract for WO 03/055959, listed as document B66 above, 2003.
Franklin, et al., "An Enhanced CVD Approach to Extensive Nanotube Networks with Directionality," *Advanced Materials* 12:890-894 (2000).
McMillan, et al., "High Velocity Attrition Nozzles in Fluidized Beds," *Powder Technology* 175:133-141 (2007).
Ohkita, et al., "The Competitive Reactions of Initiator Fragments and Growing Polymer Chains Against the Surface of Carbon Black," *Carbon* vol. 16:41-45 (1978).
Wang, et al., "Using Pulsed Flow to Overcome Defluidization," *Chemical Engineering Science* 60:5177-5181 (2005).

* cited by examiner

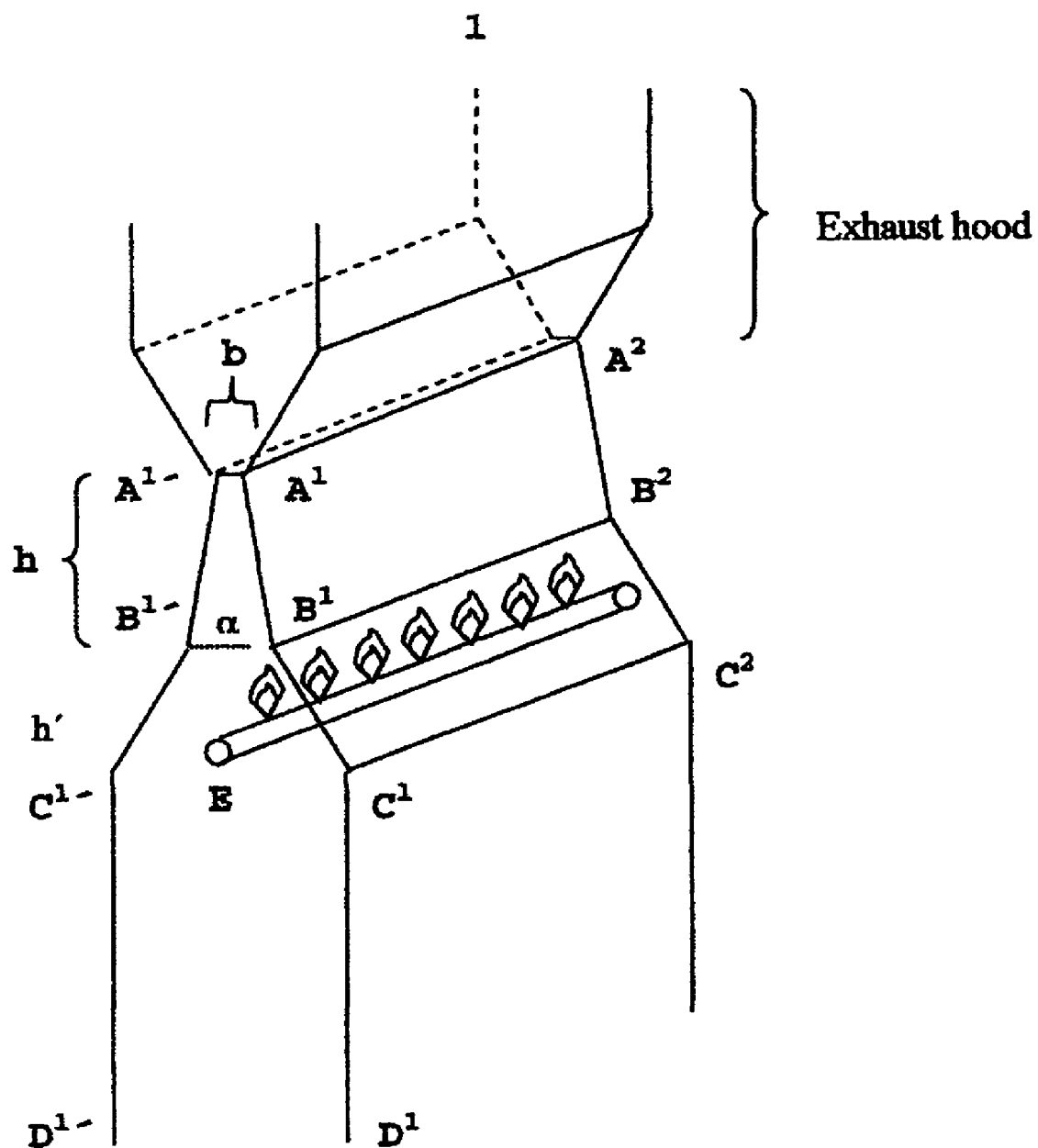

CARBON BLACK, METHOD OF PRODUCING CARBON BLACK, AND DEVICE FOR IMPLEMENTING THE METHOD

CROSS REFERENCE TO RELATED APPLICATIONS

The present application claims priority to German application 10 2006 037 079.1, filed on Aug. 7, 2006, which is incorporated in its entirety herein by reference.

FIELD OF THE INVENTION

The invention relates to a carbon black, to a method of producing carbon black, and to a device for implementing the method.

BACKGROUND OF THE INVENTION

DE 2404536 discloses a method of producing gas blacks having a low extractables content, wherein hydrogen-rich mixtures are used as carrier gas for the carbon black oil vapour, and the carbon black deposited on the cooling roll is collected. These gas blacks have an extractables content of less than 0.100% by weight.

Furthermore, WO 2005/033217 discloses unscreened, untreated carbon blacks, having a pH of less than or equal to 6.0, a residue on ignition of less than or equal to 0.1%, and a 5 μm sieve residue of less than or equal to 200 ppm. These blacks are produced by the method steps of removing the heat from the flame by thermal conduction and/or radiation, forming a thin gas boundary layer, and accelerating or expanding the flow formed by the flame and the boundary layer.

A disadvantage of the known blacks is the poor hue contribution in coatings applications.

OBJECT OF THE INVENTION

It is an object of the invention to provide a carbon black which features a high positive hue contribution in coatings applications. It is a further object of the invention to provide a method which removes as much heat as possible from the flame, without allowing the resulting black to accumulate on the cold surface.

BRIEF DESCRIPTION OF THE DRAWINGS

FIG. 1 shows the diagrammatic construction of an apparatus, for making carbon blacks.

DESCRIPTION OF THE INVENTION

The invention provides a carbon black which is characterized in that the aggregate size distribution has a $(d_{90}-d_{10})/d_{50}$ ratio of less than or equal to 1.1, preferably less than 0.8, more preferably less than 0.65.

The carbon black of the invention may have a surface oxide content of greater than 50 mmol/kg, preferably greater than 100 mmol/kg, more preferably greater than 120 mmol/kg.

The carbon black of the invention may have an aggregate size distribution with a full width at half-maximum (FWHM) to $D_{mode}$ ratio of less than or equal to 0.6, preferably less than 0.58, more preferably less than 0.56.

The carbon black of the invention may be a gas black.

The pH of the carbon blacks of the invention may be <7.0, preferably <6.0, more preferably <5.0.

The carbon black of the invention can have an STSA value of 20-300 m²/g, preferably of 50-220 m²/g, more preferably of 70-200 m²/g.

The carbon black of the invention may have a volatiles content of 2.0-20.0%, preferably of 3.0-12%, more preferably of 4.0-9.0%.

The carbon black of the invention may have a tint of 90-180%, preferably of 105-106%, more preferably of 120-150%.

The invention further provides a method of producing carbon black of the invention, which is characterized in that a gas mixture comprising a carrier gas and a carbon black feedstock is if desired admixed with hot air, the gas mixture is passed into a burner pipe, the gas mixture burns at the burner pipe openings, and the flames, together with the ambient air drawn in freely under suction from outside, are sucked through a cooled, narrowing gap and cooled, the cooled, narrowing gap having a height (h) to width (b) ratio of 1-100, preferably 5-50, more preferably 10-40, the width being based on the top edge of the gap, the width (b) being 0.5 to 10 mm, preferably 1 to 5 mm, and the flow rate at the narrowest point of the gap being 10-200 m/s, preferably 15-150 m/s, more preferably 20-100 m/s.

The flow rate can be calculated from the ratio of operational gas volume to gap area. The operational gas volume is the volume of gas taken off under suction via the fan. The gap area is given by the product of gap width b and top edge $A^1A^2$ of the cooled, narrowing gap.

The coolant used for the narrowing gap may be water, air, steam and heat-transfer oil.

In a commercially customary thin-film evaporator the carbon black feedstock can be heated and vaporized. The carbon black feedstock vapour is supplied by a stream of carrier gas to a burner pipe. Immediately upstream of the burner pipe (described for example in DE-C 671739) the gas mixture can be admixed with hot air at temperatures of up to 400° C., and supplied to the flames. The carbon black produced can be separated in commercially customary filter systems.

The carbon black feedstock used may comprise carbonaceous gases or vaporizable carbonaceous liquids. Carbon black feedstock used may comprise hydrocarbons, such as acetylene, methane, ethylene, ethane, propane, butane or pentane, or carbon black oil. Carbon black oil may be of petrochemical or carbochemical origin. The carbon black feedstock used may be a mixture of hydrocarbons and/or carbon black oils.

The gaseous or vaporized carbon black feedstock may have a temperature of up to 400° C., preferably 250-400° C., more preferably 250-350° C.

As carrier gas it is possible to use combustible gases, preferably gas mixtures having a hydrogen fraction >50% by volume, more preferably >60% by volume.

The carrier gas temperature and hot air temperature may correspond at least to the temperature of the gaseous or vaporized carbon black feedstock, in order to prevent condensation.

FIG. 1 shows the diagrammatic construction of the apparatus, where the reference symbols have the following meanings:

$A^1A^2$, $A^{1'}$, $A^{2'}$: top edge of the cooled, narrowing gap,
$B^1,B^2$, $B^{1'},B^{2'}$: bottom edge of the cooled, narrowing gap,
$A^{1'},A^1$, $A^{2'},A^2$: narrowest point of the cooled, narrowing gap,
b: width of the cooling gap=$A^{1'},A^1$ or $A^{2'},A^2$
$B^{1'},B^1$, $B^{2'},B^2$: widest point of the cooled, narrowing gap,
h: height of the cooled, narrowing gap in the upper region,
h': height of the uncooled or cooled, obliquely converging sidewalls, $C^1B^1B^2C^2$: uncooled or cooled, obliquely converging sidewall, $C^{1'}B^{1'}B^{2'}C^{2'}$: uncooled or cooled, obliquely converging sidewall, $D^{1'},D^1$: width of the vertically placed apparatus, E: height-adjustable burner pipe.

E, $A^1A^{1'}$: Burner spacing

The angle α can be 70° to 89°, preferably 80° to 89°, more preferably 83° to 88°.

The height h' can be 0 to 250 mm, preferably 100 to 250 mm, more preferably 140 to 180 mm.

The width of the vertically placed apparatus ($C^{1'}C^1=D^{1'}D^1$) can amount to 100 to 500 mm, preferably 150 to 210 mm.

The exhaust hood may follow the gap directly and may be connected to a suction withdrawal fan.

The apparatus may be manufactured of stainless steel in order to prevent the typical impurity (grit). In the case of the method of the invention there is no need for a rotating cooling roll. The flames of the burner pipe can be sucked through and cooled by a water-cooled, narrowing gap.

As shown in the sectional drawing of the apparatus of the invention (FIG. 1), the gap may extend over the entire length of the apparatus and may run parallel to the burner pipe, i.e. it can be disposed, preferably with centring, above the burner pipe. The sidewalls of the vertically placed apparatus may initially run parallel to one another ($C^1D^1D^2C^2$ or $C^{1'}D^{1'}D^{2'}C^{2'}$), then converge obliquely on one another ($C^1B^1B^2C^2$ or $C^{1'}B^{1'}B^{2'}C^{2'}$), and end in the cooled, narrowing gap ($A^1B^1B^2A^2$ or $A^{1'}B^{1'}B^{2'}A^{2'}$).

The burner spacing with respect to the cooled, narrowing gap can be made variable. This adjustment facility can be provided in order to allow the realization of an optimum burner height.

In the conically converging region (h') of the apparatus it is possible for the sidewalls to be water-cooled. In the region (h'), however, this may only serve to protect the material from the flame temperature, since it is only in the upper region (h), the correspondingly named cooling gap, that the cooling of the reaction mixture is to take place.

The construction of the cooling gap may be designed such that, as a result of the generation of a laminar boundary layer at the cooling gap, the accumulation of carbon black can be prevented.

Additives can be added to the carbon black oil. Additives may be a solution of salt in water, alcohol, oil or mixtures thereof. The additives can be converted into an aerosol. The salt used can with preference be potassium carbonate.

The invention further provides a device for implementing the process of the invention, having a burner and a cooling surface against which the flame is directed, which is characterized in that the cooled, narrowing gap has a height (h) to width (b) ratio of 1-100, preferably 5-50, more preferably 10-40, the width being based on the top edge of the gap, the width (b) is 0.5 to 10 mm, preferably 1 to 5 mm and the flow rate at the narrowest point of the gap is 10-200 m/s, preferably 15-150 m/s, more preferably 20-100 m/s.

The carbon blacks of the invention can be used as non-reinforcing filler, reinforcing filler, UV stabilizer, conductive black or pigment. The carbon blacks of the invention can be used in rubber, plastic, printing inks, liquid inks, inkjet inks, toners, coating materials, paints, paper, bitumen, concrete and other building materials. The carbon blacks of the invention can be employed as a reducing agent in metallurgy.

The carbon blacks of the invention have the advantage that blacks with a narrow aggregate size distribution can be produced, and the absolute hue contribution (dM) in coatings applications is very high.

The method of the invention has the advantage that the black does not deposit on the cooled surfaces and can therefore be deposited outside of the device.

A further advantage is that in the apparatus of the invention there are no longer any rotating parts, which reduces the capital costs and maintenance costs, and that there is no longer separation between roll black and filter black, and hence the product produced is homogenized. As a result of the removal of mechanical conveying, moreover, it is possible to lower the level of impurities in the product.

EXAMPLES

The apparatus of the invention used in the examples in accordance with FIG. 1 has a sidewall distance ($D^{1'}D^1$) of 177 mm and a height ($D^1C^1$) of 600 mm. Above a height of 600 mm, the sidewalls converge obliquely on one another and end in the cooled, narrowing gap. In the examples which follow, the length $A^1A^2$ of this cooling gap amounts to 2000 mm and the height (h) amounts to 50 mm. The height (h') of the gap in the examples below amounts to 159 mm. The angle α is 87°.

Methods pH

The pH is determined in accordance with DIN EN ISO 787-9 20.

Volatiles

The volatiles are determined at 950° C. in accordance with DIN 53552.

BET Surface Area

The BET surface area is determined in accordance with ASTM D-6556-00.

STSA Surface Area

The STSA surface area is determined in accordance with ASTM specification D-6556-00.

Tint

The tint strength is determined in accordance with ASTM specification D-3265.

Aggregate Size Distribution

The aggregate size distribution curves are measured using a Brookhaven BI-DCP disc centrifuge with red-light diode. This instrument is a development specifically for determining aggregate size distribution curves of finely divided solids from absorbance measurements, and is equipped with an automatic measuring and evaluation program for determining the aggregate size distribution.

To carry out the measurements, first of all a dispersion solution is prepared from 200 ml of ethanol, 5 drops of ammonia solution and 0.5 g of Triton X-100, made up to 1000 ml with demineralized water. Additionally a spin fluid is prepared from 0.5 g of Triton X-100 and 5 drops of ammonia solution, made up to 1000 ml with demineralized water.

Subsequently 20 ml of dispersion solution are added to 20 mg of carbon black, which are suspended in the solution for a period of 4.5 minutes in a cooling bath with 100 watts of ultrasound (80% pulse).

Prior to the beginning of the actual measurements, the centrifuge is operated for 30 minutes at a speed of 11 000 $min^{-1}$. With the disc spinning, 1 ml of ethanol is injected, and then a bottom layer of 15 ml of spin fluid is carefully laid down. After about a minute, 250 µl of the black suspension are injected, the instrument's measuring program is started, and the spin fluid in the centrifuge is overlaid with 50 µl of dodecane. A duplicate determination is performed on each sample for measurement.

The raw data curve is then evaluated using the instrument's arithmetic program, with correction for scattered light and with automatic baseline adaptation.

The $\Delta D_{50}$ value (FWHM) is the width of the aggregate size distribution curve at half the peak height. The $D_{mode}$ value (modal value) is the aggregate size having the greatest frequency (peak maximum of the aggregate size distribution curve). The values $d_{10}$, $d_{50}$ and $d_{90}$ are the aggregate sizes determined from the cumulative curve with a volume fraction of 10%, 50% and 90%, respectively.

Surface Oxides

Regarding the characterization and quantification of surface oxides on the carbon black's surface, i.e., here, functional groups containing oxygen, such as carboxyl, lactol and phenol groups:

The initial mass of carbon black, $m_i$, is guided by the number of surface oxides anticipated. As a starting point for the initial mass, the volatiles content of the carbon black can be employed (Table 1).

TABLE 1

| Volatiles content in % by weight | Initial mass of carbon black, $m_i$ in g |
|---|---|
| 1 | 5 |
| 2 | 4.5 |
| 3-6 | 4 |
| 7-9 | 3 |
| 10-11 | 2 |
| 12-15 | 1.5 |
| 16-17 | 1 |
| 18-19 | 0.9 |
| 20-23 | 0.8 |
| 24 | 0.7 |
| 25 | 0.6 |
| 26 | 0.5 |

The quantity of carbon black specified in Table 1, dried at 105° C., is weighed out to an accuracy of 0.1 mg into a glass centrifuge tube, and 25 ml (volume $V_1$) of 0.05 M aqueous sodium hydroxide solution are added. The air in the centrifuge tube above the sample is displaced by nitrogen, and the tube is tightly sealed, inserted into a holder, and mixed overnight in a rotation machine.

After the end of the mixing procedure, the contents are transferred to another centrifuge tube and centrifuged for at least 1 minute.

10 ml (volume $V_2$) of the supernatant solution are withdrawn by pipette and transferred to a glass beaker, 20 ml of 0.025 m sulphuric acid are added, and the mixture is boiled briefly in order to expel carbonate.

The samples are subsequently back-titrated with 0.05 m aqueous sodium hydroxide solution to a pH of 6.5 (pH electrode). The amount of sodium hydroxide solution consumed is $V_3$.

A blank sample must be prepared accordingly. To determine the blank value, the amount of NaOH consumed, $Bl_3$, is obtained similarly.

On the basis of the initial carbon black mass $m_i$, the volumes $V_{1-3}$ and $Bl_3$, the amount of surface oxides, G, in mmol/kg, is calculated in accordance with the following equation:

$$G = \frac{V_1 \cdot (V_3 - Bl_3)}{V_2 \cdot m_i} \cdot 0.05 \left[\frac{mol}{l}\right] \cdot 1000$$

In this formula the symbols have the following meanings:
$m_i$: Initial carbon black mass in g,
$V_1$: Volume in ml of the reagent solutions (=25 ml) added to the carbon black,
$V_2$: Volume in ml of sample solution withdrawn by pipette (=10 ml),
$V_3$: Amount of sodium hydroxide solution consumed for titration, in ml,
$Bl_3$: Amount of sodium hydroxide consumed, in ml, for the blank value titration.

Relative Black Value My and Absolute Hue Contribution dM
Description/Procedure
1. Preparation of Reagents

| Ingredients | in g | in % by wt. |
|---|---|---|
| Diluent formula | | |
| Xylene | 1125 | 68.20 |
| Ethoxypropanol | 225 | 13.63 |
| Butanol | 150 | 9.09 |
| Baysilon OL 17, 10% in xylene | 75 | 4.54 |
| Butyl glycol | 75 | 4.54 |
| Total | 1650 | 100.00 |
| Baysilon formula | | |
| Baysilon OL 17 | 10 | 10 |
| Xylene | 90 | 90 |
| Total | 100 | 100 |
| Component A | | |
| Alkydal F 310, 60% | 770 | 77 |
| Diluent | 230 | 23 |
| Total | 1000 | 100 |
| Component B | | |
| Maprenal MF800, 55% | 770 | 77 |
| Diluent | 230 | 23 |
| Total | 1000 | 100 |

The ingredients of the 4 formulas are mixed and are kept in a suitable vessel.

2. Preparation of the Black Coating

Formula of the black coating for determining the black value My:

| Ingredient | in g | in % by wt. |
|---|---|---|
| Standard clearcoat component A | 27.3 | 65.3 |
| Standard clearcoat component B | 12.7 | 30.4 |
| Carbon black pigment | 1.8 | 4.3 |
| Total | 41.8 | 100 |

First of all the coating components A and B are weighed out into a PTFE beaker, then the carbon black pigment, dried at 105° C., is weighed in, and 275 g of steel beads (Ø=3 mm) are added as grinding media. Finally the sample is dispersed in a Skandex mixer for 30 minutes.

After the dispersing procedure, approximately 1-2 ml of black coating are taken for the drawdown and applied to the support plate in a stripe 5 cm long and approximately 1 cm in width. Care should be taken to ensure that there are no air bubbles in the coating stripe. The film drawing bar is placed over the stripe of coating and drawn uniformly across the plate. A drawdown is produced which is approximately 10 cm long and 6 cm wide. The drawdown must be air-dried (in a fume cupboard) for at least 10 minutes.

Subsequently the sample is baked at 130° C. in a drier for 30 minutes. The samples can be subjected to measurement immediately after cooling or later. The measurements can be carried out using the Pausch Q-Color 35 instrument with WinQC+ software. The measurement takes place through the glass.

3. Calculations 3.1. Formulae and Constants 3.1.1 Hue-Independent Black Value My and Hue-Dependent Black Value Mc First of all the hue-independent black value My is calculated (Equation 1) from the tristimulus value Y of the measurement (illuminant D65/10):

$$My = 100 \cdot \log\left(\frac{100}{Y}\right) \quad (1)$$

Subsequently the hue-dependent black value (Equation 2) is calculated:

$$Mc = 100 \cdot \left(\log\left(\frac{X_n}{X}\right) - \log\left(\frac{Z_n}{Z}\right) + \log\left(\frac{Y_n}{Y}\right)\right) \quad (2)$$

$X_n/Z_n/Y_n$ (DIN 6174)=tristimulus values of the coordinate origin, based on the illuminant and the observer (DIN 5033/part 7, illuminant D65/10°)
$X_n$=94.81 $Z_n$=107.34 $Y_n$=100.0
X/Y/Z=tristimulus values calculated from the measurements of the samples.

3.1.2 Absolute Hue Contribution dM

The absolute hue contribution dM (Equation 3) is calculated from the black values Mc and My:

$$dM = Mc - My \quad (3)$$

Examples 1-10

The settings for the production of the examples for the inventive carbon blacks, and of Comparative Example 6, are listed in Table 2. A device as per FIG. 1 is used.

For the inventive examples and for Comparative Example 6 the hot air temperature is 310° C. and the hydrogen content of the carrier gas is 92-99% by volume.

The burner spacing reported in Table 2 is the distance from the top edge of the burner pipe, in other words the point at which the oil vapour-carrier gas mixture emerges, to the top edge of the cooled, narrowing cooling gap.

In the subsequent table, Table 3, the analytical data of the inventive carbon blacks and of a comparison black are shown. The comparison black used (Example 7) is that of Example 3 from WO 2005/033217.

TABLE 2

| Example | Gap dimensions height: width | Gap width b mm | Burner spacing [mm] | Hot air [m³/h(stp)] | Carrier gas volume [m³/h(stp)] | Oil vapour quantity [m³/h(stp)] | Operational gas volume [m³/h(stp)] | Flow rate [m/s] |
|---|---|---|---|---|---|---|---|---|
| 1 | 12.5 | 4 | 171 | 9 | 3 | 3 | 650 | 22.6 |
| 2 | 25 | 2 | 181 | 14 | 4 | 3.2 | 650 | 45.1 |
| 3 | 25 | 2 | 171 | 14 | 3 | 3.2 | 650 | 45.1 |
| 4 | 25 | 2 | 181 | 18 | 4 | 3.2 | 650 | 45.1 |
| 5 | 33 | 1.5 | 181 | 17 | 4 | 3.2 | 650 | 60.2 |
| 6 (Comparative Example) | 12.5 | 4 | 171 | 9 | 4 | 3 | 250 | 8.7 |

TABLE 3

| Example | BET [m²/g] | STSA [m²/g] | Volatiles (950° C.) [%] | pH | Tint [%] | Surface oxides [mmol/kg] | Coating My | Coating dM | $(d_{90} - d_{10})/d_{50}$ | FWHM/$D_{mode}$ |
|---|---|---|---|---|---|---|---|---|---|---|
| 1 | 93.1 | 76.1 | 4.8 | 3 | 120.5 | 130 | 251 | 4.2 | 0.57 | 0.55 |
| 2 | 142.9 | 118.7 | 4.3 | 3.6 | 141.3 | 170 | 284 | 15 | 0.58 | 0.55 |
| 3 | 169.5 | 132.2 | 4.5 | 3.4 | 142.6 | 200 | 293 | 18.5 | 0.60 | 0.54 |
| 4 | 274 | 190.9 | 8.76 | 3.07 | 146.6 | 320 | 282 | 2.3 | 0.64 | 0.60 |
| 5 | 274.8 | 192.3 | 7.75 | 3.1 | 141.3 | 290 | 284 | 4.4 | 0.64 | 0.58 |
| 6 (Comparative Example) | Experiment discontinued owing to deposition of black in the cooled, narrowing gap | | | | | | | | | |
| 7 (Comparative Example) | 316.6 | 244.2 | 4.62 | 3.9 | | 220 | 291 | −0.8 | 1.35 | 0.63 |

The results show that the carbon blacks of the invention (Examples 1-5) have an aggregate size distribution with a $(d_{90}-d_{10})/d_{50}$ ratio of less than or equal to 1.1. The advantage of the carbon blacks of the invention is manifested in a dM value of >0.5 and in a resulting higher blue hue.

All references cited herein are fully incorporated by reference. Having now fully described the invention, it will be understood by those of skill in the art that the invention may be practiced within a wide and equivalent range of conditions, parameters and the like, without affecting the spirit or scope of the invention or any embodiment thereof.

What is claimed is:

1. Carbon black comprising an aggregate size distribution with a $(d_{90}-d_{10})/d_{50}$ ratio of 0.57-0.60 and a full width at half-maximum (FWHM) to $D_{mode}$ ratio of 0.54-0.60 and wherein said carbon black is a gas black.

2. The carbon black of claim 1, wherein said carbon black has a pH of less than 7.0.

3. The carbon black of claim 2, wherein said carbon black has a volatiles content of 2.0-20.0%.

4. The carbon black of claim 3, wherein said carbon black has a tint of 90-180%.

5. The carbon black of claim 4, wherein said carbon black has an STSA value of 20-300 m$^2$/g.

6. The carbon black of claim 1, wherein said carbon black has a pH of less than 5.0.

7. The carbon black of claim 6, wherein said carbon black has a volatiles content of 4.0-9.0%.

8. The carbon black of claim 7, wherein said carbon black has a tint of 120-150%.

9. The carbon black of claim 8, wherein said carbon black has an STSA value of 70-200 m$^2$/g.

10. The carbon black of claim 1, wherein said carbon black has a volatiles content of 2.0-20.0%.

11. The carbon black of claim 1, wherein said carbon black has a volatiles content of 4.0-9.0%.

12. The carbon black of claim 1, wherein said carbon black has a tint of 90-180%.

13. The carbon black of claim 1, wherein said carbon black has a tint of 120-150%.

14. The carbon black of claim 1, wherein said carbon black has an STSA value of 20-300 m$^2$/g.

15. The carbon black of claim 1, wherein said carbon black has an STSA value of 70-200 m$^2$/g.

16. A composition comprising a carbon black according to claim 1, wherein said composition is selected from the group consisting of: a non-reinforcing filler, a reinforcing filler, a UV stabilizer, a conductive black, a pigment, a reducing agent, rubber, plastic, a coating material, paint, paper, bitumen, concrete and other building materials.

17. The carbon black of claim 16, wherein said carbon black:
a) has a pH of less than 7.0;
b) has a volatiles content of 2.0-20.0%; and
c) has a tint of 90-180%.

18. A composition comprising a carbon black according to claim 1, wherein said composition is selected from the group consisting of: toner, printing ink, liquid ink, and inkjet ink.

19. The carbon black of claim 18, wherein said carbon black:
a) has a pH of less than 7.0;
b) has a volatiles content of 2.0-20.0%; and
c) has a tint of 90-180%.

20. The carbon black of claim 18, wherein said carbon black:
a) has a pH of less than 5.0;
b) has a volatiles content of 4.0-9.0; and
c) has a tint of 120-150%.

* * * * *